United States Patent
van Putten et al.

(10) Patent No.: US 10,071,536 B2
(45) Date of Patent: Sep. 11, 2018

(54) PROCESS FOR THE MANUFACTURE OF A MULTILAYER MATERIAL SHEET, MULTILAYER MATERIAL SHEET AND USE HEREOF

(71) Applicant: DSM IP Assets B.V., Heerlen (NL)

(72) Inventors: Koen van Putten, Amstenrade (NL); Johannes Maria Mathias Wilms, Helden (NL); Ernst Jan van Klinken, Berg en Terblijt (NL); Harm van der Werff, Bunde (NL); Leonard Josef Arnold Nielaba, Eygelshoven (NL); Roelof Marissen, Born (NL)

(73) Assignee: DSM IP ASSETS B.V., Heerlen (NL)

( * ) Notice: Subject to any disclaimer, the term of this patent is extended or adjusted under 35 U.S.C. 154(b) by 0 days.

(21) Appl. No.: 14/807,838

(22) Filed: Jul. 23, 2015

(65) Prior Publication Data

US 2015/0328860 A1    Nov. 19, 2015

Related U.S. Application Data

(63) Continuation of application No. 13/515,936, filed as application No. PCT/EP2010/069939 on Dec. 16, 2010.

(30) Foreign Application Priority Data

Dec. 17, 2009 (EP) ..................... 09179673

(51) Int. Cl.
| | |
|---|---|
| B32B 5/12 | (2006.01) |
| B32B 27/12 | (2006.01) |
| B32B 37/18 | (2006.01) |
| B32B 5/26 | (2006.01) |
| F41H 5/04 | (2006.01) |
| B32B 37/10 | (2006.01) |

(52) U.S. Cl.
CPC ............... *B32B 5/12* (2013.01); *B32B 5/26* (2013.01); *B32B 27/12* (2013.01); *B32B 37/18* (2013.01); *F41H 5/0485* (2013.01); *B32B 37/1027* (2013.01); *B32B 2250/20* (2013.01); *B32B 2260/023* (2013.01); *B32B 2260/046* (2013.01); *B32B 2262/0253* (2013.01); *B32B 2262/0269* (2013.01); *B32B 2305/10* (2013.01); *B32B 2307/54* (2013.01); *B32B 2309/02* (2013.01); *B32B 2309/12* (2013.01); *B32B 2323/04* (2013.01); *B32B 2355/00* (2013.01); *B32B 2375/00* (2013.01); *B32B 2377/00* (2013.01); *B32B 2571/02* (2013.01); *Y10T 428/24124* (2015.01)

(58) Field of Classification Search
CPC ........ B32B 2250/20; B32B 2262/0253; B32B 2307/54; B32B 2323/04; B32B 2377/00; B32B 5/12; B32B 2305/10; B32B 2571/02; B32B 27/12; B32B 37/1027; B32B 37/18; B32B 5/26; F41H 5/0485; Y10T 428/24124
USPC ................ 2/2.5; 428/113; 442/134; 89/36.05
See application file for complete search history.

(56) References Cited

U.S. PATENT DOCUMENTS

| | | | |
|---|---|---|---|
| 5,303,644 | A | 4/1994 | Held |
| 5,766,725 | A | 6/1998 | Hogenboom et al. |
| 2006/0210749 | A1 | 9/2006 | Geva et al. |
| 2007/0163023 | A1 | 7/2007 | Steeman et al. |
| 2009/0311466 | A1 | 12/2009 | Marissen |
| 2011/0036235 | A1 | 2/2011 | Hoefnagels et al. |

FOREIGN PATENT DOCUMENTS

| | | | |
|---|---|---|---|
| EP | 0205960 | * | 5/1986 |
| EP | 0 191 306 | | 8/1986 |
| EP | 0191306 | * | 3/1992 |
| EP | 0 529 214 A2 | | 6/1992 |
| GB | 2 042 414 | | 9/1980 |
| GB | 2 051 667 | | 1/1981 |
| WO | 91/12136 | | 8/1991 |
| WO | 2007/122009 | | 11/2007 |
| WO | WO2008-077605 | * | 7/2008 |
| WO | 2008/115913 | | 9/2008 |
| WO | 2008/137218 | | 11/2008 |
| WO | 2009/121902 | | 10/2009 |
| WO | 2009/133150 | | 11/2009 |
| WO | 2010/138143 | | 12/2010 |

OTHER PUBLICATIONS

International Search Report for PCT/EP2010/069939, dated Mar. 28, 2011.

* cited by examiner

*Primary Examiner* — Camie S Thompson
(74) *Attorney, Agent, or Firm* — Nixon & Vanderhye P.C.

(57) ABSTRACT

Multilayer material sheets containing unidirectional high performance fibers are obtained by a process which includes the steps of positioning the fibers in a parallel fashion, consolidation of the fibers to obtain a monolayer, stacking at least two monolayers such that the fiber direction in one monolayer is at an angle a to the direction of the fibers in an adjacent monolayer and fixation whereby the stack of at least two monolayers is subjected to a pressure and temperature treatment for a duration of a least 2 seconds, followed by cooling the stack under pressure to a temperature of 120° C. or lower. The multilayer material sheet has a reduced uptake of liquids.

19 Claims, No Drawings

PROCESS FOR THE MANUFACTURE OF A MULTILAYER MATERIAL SHEET, MULTILAYER MATERIAL SHEET AND USE HEREOF

This application is a continuation of commonly owned copending U.S. application Ser. No. 13/515,936, filed Sep. 4, 2012, which is the national phase application under 35 USC § 371 of PCT/EP2010/069939, filed Dec. 16, 2010 which designated the U.S. and claims the benefit of priority of EP 09179673.0, filed Dec. 17, 2009, the entire contents of each of which are hereby incorporated by reference.

The present invention relates to the manufacture of a multilayer material sheet, the multilayer material sheet itself, and the use hereof in anti ballistic application.

A process for the manufacture of a multilayer material sheet is known from EP-A-0191 306. This document discloses in one of the examples the alignment of unidirectional high strength polyethylene fibers and impregnating the fibers with 27.3 wt % of a solution of Kraton elastomer in dicholoromethane as solvent. The obtained sheets were made on a drum winder, typically resulting in sheets with a length/width ratio of less then 2.

When the multilayer material sheets manufactured with the process according to the prior art are contacted with liquids a certain uptake of these liquids may occur. Such could be the case when cleaning a bullet resistant vest with e.g. a liquid detergent; another case may be where a ballistic resistant product is contacted with e.g. kerosene or water. High liquid uptake of a multilayer material sheet is not preferred.

Object of the invention therefore is to provide a process for the manufacture of a multilayer material sheet with a lower uptake of liquid than the known multilayer material sheets.

This object is obtained through a process for the manufacture of a multilayer material sheet comprising unidirectional high performance fibers, the process comprising the steps of:
  a. positioning the fibers in a parallel fashion,
  b. consolidation of the fibers to obtain a monolayer,
  c. stacking at least two monolayers such that the fiber direction in one monolayer is at an angle α to the direction of the fibers in an adjacent monolayer,
  d. fixation whereby the stack of at least two monolayers is subjected to a pressure and temperature treatment characterized in that the duration of the pressure treatment is a least 2 seconds at a pressure of at least 0.5 MPa at a temperature below the melting point or degradation temperature of the fibers, whichever is the lowest for the fiber, of
    the fibers, followed by cooling the stack of at least two monolayers under pressure to a temperature of 120° C. or lower, preferably 80° C. or lower.

With this process a multilayer material sheet is obtained that has a reduced liquid uptake. An additional advantage is a good stab resistance of the multilayer material sheet increases.

High performance fibers as used in the process according to the invention have a tensile strength of at least 1.0 GPa and a tensile modulus of at least 40 GPa and are known per se. The fibers have an elongated shape whose length dimension is larger than their width, thickness or cross section. The term "fibers" includes a monofilament, a multifilament yarn, a tape, a strip, a thread, a staple fiber yarn and other elongate objects having a regular or irregular cross-section. In a special embodiment, fiber relates to an object with an elongated shape having a cross section aspect ratio of between 1 and 5. A cross section aspect ratio herein is the largest dimension of a cross section of a fiber divided by the smallest dimension of a cross section of a fiber. For example a fiber with a cross section in the form of a circle has a cross section aspect ratio of 1. For application of the fibers in ballistic-resistant articles it is essential that the fibers have a high tensile strength, a high tensile modulus and/or high energy absorption. It is preferred for the fibers to have a tensile strength of at least 1.2 GPa and a tensile modulus of at least 40 GPa, more preferably the fibers to have a tensile strength of at least 2.0 GPa, even more preferably the fibers to have a tensile strength of at least 3.0 GPa, most preferably the fibers to have a tensile strength of at least 3.6 GPa.

The high performance fiber preferably contains a polymer that is selected from the group consisting of polyolefins, polyesters, polyvinyl alcohols, polyacrylonitriles, polyamides, especially poly(p-phenylene teraphthalamide), liquid crystalline polymers and ladder-like polymers, such as polybenzimidazole or polybenzoxazole, especially poly(1, 4-phenylene-2,6-benzobisoxazole), or poly(2,6-diimidazo [4,5-b-4',5'-e]pyridinylene-1,4-(2,5-dihydroxy)phenylene).

In a preferably embodiment, the polyolefin comprises polyethylene and polypropylene. Preferably the polyolefin comprises high molecular weight polyethylene having a weight average molecular weight of at least 400,000 g/mol more preferably of at least 800,000 g/mol, even more preferably having a weight average molecular weight of at least 1,200,000 g/mol, more preferably the polyolefin comprises ultra high molecular weight polyethylene having a weight average molecular weight of at least 2,500,000 g/mol. Preferably, use is made of polyethylene fibers consisting of polyethylene filaments prepared by a gel spinning process as described in for example GB-A-2042414 and GB-A-2051667.

In another preferred embodiment, the high performance fiber contains a polyamide preferably based on terephthalic acid monomers, so-called aramid fibers, such as e.g. poly (p-phenylene terephthalamide), poly(m-phenylene terephthalamide) and copolymers such as co-poly(p-phenylene terephthalamide 3,4'oxydiphenylene terephthalamide).

In the process according to the invention, the positioning of the fibers in a parallel fashion may be done by for instance pulling a number of fibers from fiber bobbins on a bobbin frame over a comb so that they are oriented in a parallel fashion in one plane. Consolidation of the fibers is done so that they maintain their parallel fashion for example by embedding at least a part of the fibers in a plastic material, the plastic material in this way serving as matrix material and binding or holding the fibers together. Such embedding at least a part of the fibers in a plastic material to consolidate parallel aligned fibers into a monolayer is well known in the art and may be done by e.g. feeding matrix material as a solution or a dispersion to the fibers, followed by e.g. evaporating the solvent. In this way a monolayer is obtained which means a layer of substantially parallel fibers being consolidated so that they maintain their parallel fashion. The plastic material serving as matrix material may consist of a polymer material, and optionally may contain fillers usually employed for polymers. The polymer may be a thermoset or a thermoplastic or mixtures of both.

Thermosets and thermoplastics that are suitable as plastic material are listed in for instance WO-A-91/12136 (line 26, page 15 to line 23, page 21). Preferably, vinylesters, unsaturated polyesters, epoxies or phenol resins are chosen as matrix material from the group of thermosetting polymers.

These thermosetting polymers usually are in the monolayer in partially set condition (the so-called B stage) before consolidation. From the group of thermoplastic polymers polyurethanes, polyvinyls, polyacryls, polyolefins or thermoplastic, elastomeric block copolymers such as polyisoprene-polyethylene-butylene-polystyrene or polystyrene-polyisoprene-polystyrene block copolymers are preferably chosen as matrix material.

In one preferred embodiment a soft plastic is used, in particular it is preferred for the plastic matrix material to be an elastomer with a tensile modulus at 25° C. of at most 41 MPa (determined in accordance with ASTM D638, at 25° C.) as mentioned in EP-A-0191 306 which is hereby fully incorporated by reference. Preferably, the elongation to break of the plastic is greater than the elongation to break of the reinforcing fibers. The elongation to break of the matrix preferably is from 3 to 500%.

In another preferred embodiment a matrix material is used that contains a polyurethane. More preferably, the polyurethane is a polyetherurethane; that is based on a polyetherdiol, since that provides good performance over a wide temperature range. In a special embodiment, the polyurethane or polyetherurethane is based on aliphatic diisocyanates as this further improves colour stability of the multilayer material sheet.

Such a matrix material even further reduces uptake of the multilayer material sheet.

The content of the plastic material in the monolayer is chosen sufficiently low, for example to save weight. Preferably the content of the plastic material is lower than 30 wt. % relative to the total weight of the monolayer. More preferably, the content is lower than 20 wt. %, even more preferably lower than 15 wt. %. Most preferably the content of the plastic material in the monolayer lower than 10 wt. %.

At least two of such monolayers are stacked (and rotated) such that the fiber direction in one monolayer is at an angle α, not being 0 degrees, to the direction of the fibers in an adjacent monolayer. Good results are achieved when this angle α is at least 30 degrees, preferably this angle α is at least 45 degrees. More preferably this angle α is between 50 and 90 degrees, even more preferably this angle α is between 75 and 90 degrees.

The stack is a continuous stack meaning that the length direction is at least 10 times the width direction, more preferably at least 30 times the width direction, most preferably at least 30 times the width direction. The stack of at least two fiber layers, preferably of at least two monolayers preferably is interconnected e.g. through calendaring or otherwise at least locally adhering the at least two fiber layers or the at least two monolayers. Calendaring conditions such as temperature and pressure are chosen sufficiently high to prevent delamination of the stack, while on the other hand not too high to prevent deterioration of fiber properties e.g. due to melting of the fiber (which may suitably be determined through known techniques such as DSC at a heating rate of 10° C./min), or in the event of non-melting fibers the temperature at which the mechanical properties of the fibers decreases significantly, i.e. with more than 20% (which may suitably be determined through known techniques such as dynamic mechanical analysis at a heating rate of 10° C./min). Such deterioration of fiber properties may account for a reduced anti-ballistic performance. Typical ranges for temperature are preferably between 75 and 155° C. in e.g. the event of polyethylene fibers, a typical pressure will be preferably at least 0.05 MPa, whereby good conditions for temperature and pressure can be found by the skilled person with some routine experimentation. While selecting temperature and pressure of a calendar it should be noted that contact in a calendar is a line contact, between the 2 calendar rolls, whereby pressure and temperature are exerted on the material for a short time, typically less than 0.5 second. Local adhering may be done through e.g. stitching.

The fixation of the stack of at least two monolayers is done by subjecting the stack to a pressure and temperature treatment for a duration of at least 2 seconds at a pressure of at least 0.5 MPa at a temperature below the melting point or degradation temperature of the fibers, followed by cooling the stack of at least two monolayers under pressure to a temperature of 80° C. or lower. Preferably the duration of the pressure and temperature treatment is at least 5 seconds, more preferably the duration of the pressure and temperature treatment is at least 10 seconds, this gives an even better reduction of liquid uptake. Even more preferably the duration of the pressure and temperature treatment is at least 20 seconds, most preferably the duration of the pressure and temperature treatment is at least 40 seconds. In principle there is no limitation to the duration, but for practical reasons this will generally be less than 120 seconds.

In a special embodiment of the invention, interconnecting of fiber layers and consolidation of fibers oriented in a parallel fashion in one plane may take place during fixation. In such a way process steps b., c., and d. of the invention may at least partly be combined. In this embodiment at least on set of fibers oriented in a parallel fashion in one plane are fed to the fixation step together with at least one monolayer in such a way that the fiber direction in the monolayer is at an angle α, not being 0 degrees, to the direction of the adjacent layer with fibers. An advantage of such an embodiment is that even lower amounts of matrix material may be used.

The pressure during the fixation is at least 0.5 MPa, preferably this pressure is at least 1.0 MPa, more preferably this pressure is at least 1.5 MPa, even more preferably this pressure is at least 2.0 MPa, most preferably this pressure is at least 2.5 MPa. Generally this pressure will be chosen below 10 MPa, preferably below 8.0 MPa.

The temperature during the fixation should be chosen not too high in order to prevent deterioration of fiber properties. For example for polyethylene fibers this temperature is preferably between 75 and 145° C., more preferably between 85 and 135° C. After this treatment the stack of at least two monolayers is cooled under pressure to a temperature of 120° C. or lower, preferably 80° C. or lower, more preferably to a temperature of 50° C. or lower. Time for cooling depends on the temperature difference between fixation temperature, e.g. 145° C. for poylethylene, and the desired temperature after cooling under pressure, e.g. 80° C. Generally this time may be at least 1 second, preferably at least 2 seconds. Typically such cooling will be achieved within 120 seconds.

Suitable equipment to perform the fixation step may be a belt press, preferably a belt press with a heating section followed by a cooling section.

Preferably the belt press is a press that can apply isobaric pressures, meaning that a constant pressure that is uniformly distributed over the surface of the stack. This pressure may suitably be applied as a hydrostatic pressure and has essentially the same value independent on the location on the surface. A belt press that works under isobaric conditions is known per se. A suitable device for carrying out the fixation is for instance described in more detail in EP0529214, which is hereby incorporated herein by reference.

The process according to the invention may be performed in a discontinuous manner by making separate multilayer material sheets, e.g. as produced through a drum winder, where after these sheets may be subjected to a pressure treatment according to the invention in e.g. a belt press. In the event of discontinuously produced sheets on e.g. a drum winder, preferably a continuous multilayer material sheet is made which may be done by e.g. slightly overlapping and adhere the above mentioned separate multilayer material sheets to form a product that can be put on a roll. More preferably the continuous multilayer material sheet according to the invention is made according to the process as described in patent U.S. Pat. No. 5,766,725 which is hereby incorporated by reference, combined with a fixation device in the form of e.g. a belt press, preferably an isobaric belt press.

A multilayer material sheet comprising unidirectional high performance fibers obtainable with the process of the invention has a reduced liquid uptake when compared with known multilayer material sheets. Consequently the invention also relates to such multilayer material sheet comprising unidirectional high performance fibers.

In one preferred embodiment the multilayer material sheet according to the invention also comprises at least one plastic film. Preferably such plastic film is adhered to one or both outer surfaces of the multilayer material sheet. Such adhering suitably may be done during stacking of the at least two monolayers, or in the fixation step of the stack of at least two monolayers. Such plastic film permits multilayer material sheets to slide over each other in e.g. a stack of multilayer material sheets used for soft ballistics such as a bullet resistant vest. Therefore such multilayer material sheet may suitably be used in bullet resistant vest or other gear. This plastic film may suitably be based on polymers chosen from polyolefins, including polypropylene, linear low density polyethylene (LLDPE), ultrahigh molecular weight polyethylene (UHMWPE); polyesters, including polyethyleneterephthalate; polyamides, including polyamide 6; polycarbonate, polyurethane and comparable polymers. Preferably use is made of LLDPE. Thickness of the films may range from 1-30 μm, preferably from 2-20 μm, more preferably from 3-15 μm.

In another preferred embodiment the multilayer material sheet according to the invention may suitably be used in the manufacture of hard articles, preferably hard ballistic articles. Examples of such articles are panels, e.g. for armoring of vehicles, and curved articles such as helmets and radomes. In such use the multilayer material sheet according to the invention preferably does not comprise a plastic film.

Test methods;
Molecular weight, Mw: Intrinsic viscosity is a measure for molecular weight that can more easily be determined than actual molar mass parameters like $M_w$. There are several empirical relations between IV and $M_w$, but such relation is highly dependent on molar mass distribution. In the present invention IV is measured that relates to Mw through the equation $M_w = 5.37 \times 10^4 [IV]^{1.37}$ (see EP 0504954 A1). An IV of 8 dl/g would be equivalent to $M_w$ of about 930 kg/mol.

IV: the Intrinsic Viscosity is determined according to method PTC-179 (Hercules Inc. Rev. Apr. 29, 1982) at 135° C. in decalin, the dissolution time being 16 hours, with DBPC as anti-oxidant in an amount of 2 g/l solution, by extrapolating the viscosity as measured at different concentrations to zero concentration;

The melting point of a polymer is determined by DSC on a power-compensation PerkinElmer DSC-7 instrument which is calibrated with indium and tin with a heating rate of 10° C./min. For calibration (two point temperature calibration) of the DSC-7 instrument about 5 mg of indium and about 5 mg of tin are used, both weighed in at least two decimal places. Indium is used for both temperature and heat flow calibration; tin is used for temperature calibration only.

Tensile properties (measured at 25° C.): tensile strength (or strength), tensile modulus (or modulus) and elongation at break (or eab) are defined and determined on multifilament yarns as specified in ASTM D885M, using a nominal gauge length of the fiber of 500 mm, a crosshead speed of 50%/min. On the basis of the measured stress-strain curve the modulus is determined as the gradient between 0.3 and 1% strain. For calculation of the modulus and strength, the tensile forces measured are divided by the titre, as determined by weighing 10 metres of fiber; values in GPa are calculated assuming a density of 0.97 g/cm³. Tensile properties of thin films were measured in accordance with ISO 1184(H).

Ballistic resistance: $V_{50}$ and Eabs were determined at 21° C. with test procedures according to Stanag 2920, using 9 mm*19 mm FMJ Parabellum bullets (from Dynamit Nobel). After conditioning at 21° C. and 65% relative humidity during at least 16 hours, a stack of sheets was fixed using flexible straps on a support filled with Caran D'Ache backing material, which was preconditioned at 35° C.

The invention will now be elucidated by the following examples and comparative experiment without being limited hereto.

COMPARATIVE EXPERIMENT A

A multilayer material sheet, comprising ultra high molecular weight polyethylene fibers manufactured by DSM Dyneema with a strength of 3.5 GPa, was made by parallel aligning the fibers and adding 18 wt % of a Kraton styrene-isoprene-styrene triblock copolymer as matrix. Total weight of the monolayer was 65.5 gram. Two of such monolayers were stacked such that the fiber direction between the 2 monolayers was at an angle of 90°. At both outer surfaces a LLDPE film with a thickness of 7 micrometer was added and the stack was calendared at a temperature of 135° C. and a line pressure of 45 N/mm to obtain a multilayered material sheet. Pressing time in the calendar was 0.15 second.

From this multilayer material sheet squares of 40*40 cm were cut and immersed in a detergent solution comprising 95 wt % water and 5 wt % of commercially available detergent. Immersion took place during 30 minutes after which the multilayer material sheet was wiped off with paper towel and weight gain (compared to weight before immersion) was recorded.

EXAMPLE 1

The multilayer material sheet comprising ultra high molecular weight polyethylene fibers as made in comparative experiment A was fed through a double belt press at a pressure of 8 MPa and a temperature of 130° C. for a time of 10.5 seconds, followed by cooling under pressure to 80° C. before exiting the double belt press. Samples of 40*40 cm were cut and liquid uptake was determined in the same manner as for comparative experiment A.

COMPARATIVE EXPERIMENT B

A multilayer material sheet comprising cross plied monolayers of unidirectionally aligned aramid fibers, commercially available under the name Gold Flex® 95638/AD266, was taken and samples of 40*40 cm were cut. From these samples kerosene uptake was determined by immersion in kerosene during 30 minutes after which the multilayer material sheet was wiped off with paper towel and weight gain (compared to weight before immersion) was recorded. Furthermore the ballistic resistance of a stack, with a total weight of 3 kilogram/m$^2$, of Gold Flex sheets was determined. The ballistic resistance was determined before liquid take up and expressed as energy absorption (Eabs) in the table below.

EXAMPLE 2

The multilayer material sheet comprising aramid fibers as used in comparative experiment B was fed through a double belt press under the following conditions: a pressure of 8 MPa and a temperature of 150° C. for a time of 20 seconds, followed by cooling under pressure to 80° C. before exiting the double belt press. Again liquid uptake and ballistic resistance was determined in the same way as in comparative experiment B.

COMPARATIVE EXPERIMENT C

Example 1 is repeated whereby the multilayer material sheet is fed through a double belt press at a pressure of 8 MPa and a temperature of 130° C. for a time of 10.5 seconds. In this experiment no cooling under pressure takes place.

The results of the tests are shown in the table below.

| Sample | Liquid uptake (wt %) | Eabs [J*m$^2$/kg] |
| --- | --- | --- |
| Comparative experiment A | 9.0 | |
| Example 1 | 4.5 | |
| Comparative experiment B | 135 | 243 |
| Example 2 | 50 | 261 |
| Comparative experiment C | 8.0 | |

The above table clearly shows the reduced liquid uptake of the multilayer material sheets as obtained with the process according to the invention. Furthermore an increased ballistic resistance, expressed as a higher Eabs, was seen.

The invention claimed is:

1. A multilayer material sheet suitable for use in soft ballistic applications, wherein the multilayer material sheet comprises:
   at least two monolayers comprised of unidirectional high performance fibers with a tensile strength of at least 1.0 GPa and a tensile modulus of at least 40 GPa, and
   at least one plastic film positioned at an outer surface of the multilayer material sheet to allow the multilayer material sheet and an adjacent multilayer material sheet in a stack thereof to slide relative to one another, wherein
   the multilayer material sheet is obtained by a process comprising the steps of:
   (a) positioning the fibers in a parallel fashion,
   (b) consolidating the parallel fibers to obtain a monolayer,
   (c) stacking at least two monolayers such that a fiber direction in one monolayer is at an angle a relative to a direction of the fibers in an adjacent monolayer to thereby form a continuous stack, and
   (d) fixating the continuous stack of at least two monolayers formed by step (c) by subjecting the continuous stack of at least two monolayers for a duration of at least 2 seconds to a pressure treatment at a pressure of at least 0.5 MPa and a temperature treatment at a temperature below a melting point or degradation temperature of the fibers to thereby form a pressure and temperature treated stack of at least two fixed monolayers, and thereafter
   (e) subjecting the pressure and temperature treated stack of at least two fixed monolayers formed by step (d) to controllable rapid cooling under pressure to cool the stack of at least two fixed monolayers from the melting point or degradation temperature of the fibers to a temperature of 80° C. or lower within at least 2 seconds to less than 120 seconds.

2. The multilayer material sheet of claim 1, wherein the unidirectional high performance fibers are polyolefin fibers.

3. The multilayer material sheet of claim 1, wherein the unidirectional high performance fibers are polyethylene fibers.

4. The multilayer material sheet according to claim 3, wherein the polyethylene fibers are ultrahigh molecular weight polyethylene fibers.

5. The multilayer material sheet according to claim 4, wherein the at least one plastic film has a thickness between 1-30 μm.

6. The multilayer material sheet of claim 1, wherein the unidirectional high performance fibers are aramid fibers.

7. The multilayer material sheet according to claim 1, which further comprises an elastomeric matrix material having a tensile modulus at 25° C. of at most 41 MPa.

8. The multilayer material sheet according to claim 1, which further comprises a matrix material which includes a polyurethane.

9. The multilayer material sheet according to claim 1, wherein the at least one plastic film has a thickness between 1-30 μm.

10. A soft ballistic article comprising the multilayer material sheet according to claim 1.

11. A soft ballistic article comprising a stack of multilayer material sheets, wherein the multilayer material sheets in the stack comprise:
   at least two monolayers comprised of unidirectional high performance fibers with a tensile strength of at least 1.0 GPa and a tensile modulus of at least 40 GPa, and
   at least one plastic film positioned at an outer surface of the multilayer material sheets to allow adjacent multilayer material sheets in the stack to slide relative to one another, wherein
   the multilayer material sheets in the stack are obtained by a process comprising the steps of:
   (a) positioning the fibers in a parallel fashion,
   (b) consolidating the parallel fibers to obtain a monolayer,
   (c) stacking at least two monolayers such that a fiber direction in one monolayer is at an angle a relative to a direction of the fibers in an adjacent monolayer to thereby form a continuous stack, and
   (d) fixating the continuous stack of at least two monolayers formed by step (c) by subjecting the continuous stack of at least two monolayers for a duration of at least 2 seconds to a pressure treatment at a pressure of at least 0.5 MPa and a temperature treatment at a temperature below a melting point or degradation temperature of the fibers to thereby form a pressure and temperature treated stack of at least two fixed monolayers, and thereafter (e) subjecting the pressure and temperature treated stack of at least two fixed monolayers formed by step (d) to controllable rapid cooling under pressure to cool the stack of at least two fixed monolayers from the melting point or degradation temperature of the fibers to a temperature of 80° C. or lower within at least 2 seconds to less than 120 seconds.

12. The soft ballistic article according to claim 11, wherein the unidirectional high performance fibers are polyolefin fibers.

13. The soft ballistic article according to claim 11, wherein the unidirectional high performance fibers are polyethylene fibers.

14. The soft ballistic article according to claim 11, wherein the unidirectional high performance fibers are aramid fibers.

15. The soft ballistic article according to claim 13, wherein the polyethylene fibers are ultrahigh molecular weight polyethylene fibers.

16. The soft ballistic article according to claim 15, wherein the at least one plastic film has a thickness between 1-30 μm.

17. The soft ballistic article according to claim 11, which further comprises an elastomeric matrix material having a tensile modulus at 25° C. of at most 41 MPa.

18. The soft ballistic article according to claim 11, which further comprises a matrix material which includes a polyurethane.

19. The soft ballistic article according to claim 11, wherein the at least one plastic film has a thickness between 1-30 μm.

* * * * *